(12) United States Patent
Hebrink et al.

(10) Patent No.: US 6,449,093 B2
(45) Date of Patent: *Sep. 10, 2002

(54) OPTICAL BODIES MADE WITH A BIREFRINGENT POLYMER

(75) Inventors: Timothy J. Hebrink, Oakdale; Peter D. Condo, Lake Elmo; William W. Merrill, White Bear Lake, all of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 70 days.

(21) Appl. No.: 09/416,462

(22) Filed: Oct. 12, 1999

(51) Int. Cl.[7] .................................................. G02B 5/30
(52) U.S. Cl. ........................ 359/497; 252/585; 359/487; 359/488; 359/490; 359/493; 359/498; 359/500; 428/212; 428/213; 524/503; 525/58
(58) Field of Search .......................... 252/585; 359/497, 359/487, 488, 490, 493, 498, 500; 428/1, 212, 213, 220, 221, 332; 524/503, 603; 525/58

(56) References Cited

U.S. PATENT DOCUMENTS

| | | |
|---|---|---|
| 540,768 A | 6/1895 | Western |
| 2,803,552 A | 8/1957 | Stedman |
| 3,022,178 A | 8/1962 | Park et al. .................. 106/13 |
| 3,075,228 A | 1/1963 | Elias ............................ 15/506 |
| 3,124,639 A | 3/1964 | Kahn ............................ 88/65 |
| 3,212,909 A | 10/1965 | Leigh ......................... 106/13 |
| 3,610,729 A | 10/1971 | Rogers ....................... 350/157 |
| 3,711,176 A | 1/1973 | Alfrey, Jr. et al. ........... 350/1 |
| 3,819,522 A | 6/1974 | Zmoda ....................... 252/89 |
| 3,860,036 A | 1/1975 | Newman, Jr. ............... 138/45 |
| 3,897,356 A | 7/1975 | Pociluyko .................... 252/91 |
| 4,249,011 A | 2/1981 | Wendling |

(List continued on next page.)

FOREIGN PATENT DOCUMENTS

| | | | |
|---|---|---|---|
| EP | 591 055 | 9/1993 | ............ B32B/7/02 |
| EP | 592 284 | 9/1993 | ............ B32B/7/02 |
| JP | 6-41335 | 2/1994 | |
| WO | WO 95/27919 | 4/1995 | ........... G02B/27/28 |
| WO | WO 95/17303 | 6/1995 | ............ B32B/7/02 |
| WO | WO 95/17691 | 6/1995 | ............ G02B/5/30 |
| WO | WO 95/17692 | 6/1995 | ............ G02B/5/30 |
| WO | WO 95/17699 | 6/1995 | ......... G02F/1/1335 |

(List continued on next page.)

OTHER PUBLICATIONS

Schrenk et al., Nanolayer polymeric optical films, Tappi Journal, pp. 169–174, Jun. 1992.

Weber et al., "Giant Birefringent Optics in Multilayer Polymer Mirrors", Science, vol. 287, Mar. 31, 2000, pp. 2451–2456.

Primary Examiner—Cassandra Spyrou
Assistant Examiner—Craig Curtis
(74) Attorney, Agent, or Firm—Bruce E. Black

(57) ABSTRACT

A optical body has at least two polymeric materials forming a reflective interface for at least one polarization of light. One optical body is a multilayer optical film that includes birefringent first optical layers and second optical layers interleaved with the first optical layers. Each first optical layer is formed using a polymer, such as a copolymer of polyethylene naphthalate. The second optical layers are formed so that they have a lower in-plane birefringence than the first optical layers for 632.8 nm light. Optical bodies can be used as, for example, polarizers and mirrors. The optical bodies can be formed using polymers that provide better index matching and are more easily protected from UV light without coloring the optical body.

19 Claims, 4 Drawing Sheets

U.S. PATENT DOCUMENTS

| | | | |
|---|---|---|---|
| 4,310,584 A | 1/1982 | Cooper et al. | 428/212 |
| 4,446,305 A | 5/1984 | Rogers et al. | 528/348 |
| 4,478,909 A | 10/1984 | Taniguchi et al. | 428/331 |
| 4,520,189 A | 5/1985 | Rogers et al. | 528/331 |
| 4,521,588 A | 6/1985 | Rogers et al. | 528/363 |
| 4,525,413 A | 6/1985 | Rogers et al. | 428/212 |
| 4,720,426 A | 1/1988 | Englert et al. | 428/344 |
| 5,188,760 A | 2/1993 | Hikmet et al. | 252/299.01 |
| 5,211,878 A | 5/1993 | Reiffenrath et al. | 252/299.63 |
| 5,235,443 A | 8/1993 | Barnik et al. | 359/37 |
| 5,269,995 A | 12/1993 | Ramanathan et al. | 264/171 |
| 5,294,657 A | 3/1994 | Melendy et al. | 524/270 |
| 5,316,703 A | 5/1994 | Schrenk | 264/1.3 |
| 5,319,478 A | 6/1994 | Fijnfschilling et al. | 359/53 |
| 5,389,324 A | 2/1995 | Lewis et al. | 264/171 |
| 5,448,404 A | 9/1995 | Schrenk et al. | 359/584 |
| 5,486,935 A | 1/1996 | Kalmanash | 359/37 |
| 5,486,949 A | 1/1996 | Schrenk et al. | 359/498 |
| 5,612,820 A | 3/1997 | Schrenk et al. | 359/498 |
| 5,629,055 A | 5/1997 | Revol et al. | 428/1 |
| 5,686,979 A | 11/1997 | Weber et al. | 349/96 |
| 5,699,188 A | 12/1997 | Gilbert et al. | 359/584 |
| 5,721,603 A | 2/1998 | De Vaan et al. | 349/194 |
| 5,744,534 A | 4/1998 | Ishiharada et al. | 524/442 |
| 5,751,388 A | 5/1998 | Larson | 349/96 |
| 5,759,467 A | 6/1998 | Carter et al. | 264/173.12 |
| 5,767,935 A | 6/1998 | Ueda et al. | 349/112 |
| 5,770,306 A | 6/1998 | Suzuki et al. | 428/328 |
| 5,783,120 A | 7/1998 | Ouderkirk et al. | 264/134 |
| 5,793,456 A | 8/1998 | Broer et al. | 349/98 |
| 5,808,794 A | 9/1998 | Weber et al. | 359/487 |
| 5,825,542 A | 10/1998 | Cobb, Jr. et al. | 359/487 |
| 5,825,543 A | 10/1998 | Ouderkirk et al. | 359/494 |
| 5,867,316 A | 2/1999 | Carlson et al. | 359/500 |
| 5,882,774 A | 3/1999 | Jonza et al. | 428/212 |
| 5,940,149 A | 8/1999 | Vanderwerf | 349/5 |
| 5,962,114 A | 10/1999 | Jonza et al. | 428/212 |
| 5,965,247 A | 10/1999 | Jonza et al. | 428/212 |

FOREIGN PATENT DOCUMENTS

| | | | |
|---|---|---|---|
| WO | WO 96/18691 | 6/1996 | |
| WO | WO 96/19347 | 6/1996 | B32B/7/02 |
| WO | WO 97/01440 | 1/1997 | B32B/27/36 |
| WO | WO 97/01726 | 1/1997 | G02B/5/30 |
| WO | WO 97/01774 | 1/1997 | G02B/1/10 |
| WO | WO 97/32226 | 9/1997 | G02B/5/30 |
| WO | WO 99/06203 | 2/1999 | B29C/47/06 |
| WO | WO 99/36248 | 7/1999 | B29C/47/70 |
| WO | WO 99/36262 | 7/1999 | B32B/27/00 |
| WO | WO 99/36812 | 7/1999 | G02B/5/30 |
| WO | WO 99/36813 | 7/1999 | G02B/5/30 |
| WO | WO 99/36814 | 7/1999 | G02B/5/30 |

♦ Blocky
■ Random

OPTICAL BODIES MADE WITH A BIREFRINGENT POLYMER

FIELD OF THE INVENTION

The present invention relates to multilayer optical bodies containing at least two different materials that form a reflective interface for at least one polarization of light. The present invention also relates to optical films (including multilayer optical films) that include a birefringent copolymer of polyethylene naphthalate.

BACKGROUND OF THE INVENTION

Polymeric films are used in a wide variety of applications. One particular use of polymeric films is in mirrors and polarizers which reflect light of a given polarization and wavelength range. Such reflective films are used, for example, in conjunction with backlights in liquid crystal displays to enhance brightness and reduce glare of the display. A polarizing film can be placed between the user and the backlight to direct the light towards the user and to polarize the light; thereby reducing the glare. A mirror film can be placed behind the backlight to reflect light towards the user; thereby enhancing brightness. Another use of polarizing films is in articles, such as sunglasses, to reduce light intensity and glare.

One class of polymers that is useful in creating polarizer or mirror films is polyesters, described in, for example, U.S. Pat. Nos. 5,825,543 and 5,867,316 and PCT Publications WO 99/36262 and WO 97/32226, incorporated herein by reference. One example of a polyester-based polarizer includes a stack of polyester layers of differing composition. One configuration of this stack of layers includes a first set of birefringent layers and a second set of layers with an isotropic index of refraction. The second set of layers alternates with the birefringent layers to form a series of interfaces for reflecting light.

The optical properties of a given polyester are typically determined, at least in part, by the monomer materials utilized in the preparation of the polyester. A polyester can be prepared by reaction of one or more different carboxylate monomers (e.g., compounds with two or more carboxylic acid or ester functional groups) with one or more different glycol monomers (e.g., compounds with two or more hydroxy functional groups).

SUMMARY OF THE INVENTION

Generally, the present invention relates to optical bodies and their manufacture, as well as the use of the optical bodies in optical devices, such as polarizers and mirrors. One embodiment is a multilayer optical film that includes birefringent first optical layers and second optical layers interleaved with the first optical layers. Each first optical layer is formed using a copolymer of polyethylene naphthalate with less than 70 mol % of the carboxylate subunits being naphthalate subunits. The second optical layers have a lower in-plane birefringence than the first optical layers for 632.8 nm light. The copolymer of the first optical layers can be a random or block copolymer. The invention is also directed to methods of making and using the optical films and devices containing the optical films.

Another embodiment is a multilayer optical film that includes birefringent first optical layers and second optical layers interleaved with the first optical layers. Each first optical layer is formed using a polymer (e.g., a copolymer of polyethylene naphthalate) that is capable of yielding an in-plane birefringence of at least about 0.16 for 632.8 nm light after orienting the polymer at a temperature no more than about 5° C. above the glass transition temperature of the copolymer or, if desired, no greater than the glass transition temperature of the copolymer. The second optical layers have a lower in-plane birefringence than the first optical layers for 632.8 nm light. Preferably, the polymer is capable of yielding an in-plane birefringence of at least 0.18 for 632.8 nm light, more preferably, at least 0.19, after orienting the polymer at a temperature no more than about 5° C. above the glass transition temperature of the copolymer or, if desired, no greater than the glass transition temperature of the copolymer. The invention is also directed to methods of making and using the optical films and devices containing the optical films.

Yet another embodiment is a multilayer optical film that includes birefringent first optical layers and second optical layers interleaved with the first optical layers. Each first optical layer is formed using a copolymer of polyethylene naphthalate having no more than about 20% crystallinity, as determined by differential scanning calorimetry. The second optical layers have a lower in-plane birefringence than the first optical layers for 632.8 nm light. The invention is also directed to methods of making and using the optical films and devices containing the optical films.

A further embodiment is a method of making a multilayer optical film. A stack of optical layers is formed. The stack of optical layers includes first optical layers, made using a copolymer of polyethylene naphthalate, and second optical layers forming optical interfaces with the first optical layers. The first optical layers are then oriented at a temperature of no more than 5° C. above the glass transition temperature of the copolymer and, if desired, no greater than the glass transition temperature of the copolymer to give the first optical layers an in-plane birefringence of at least about 0.16, preferably, at least 0.18, and more preferably, at least 0.19.

Another embodiment is a multilayer optical film that includes birefringent first optical layers and second optical layers interleaved with the first optical layers. Each first optical layer is formed using a polymer (e.g., a copolymer of polyethylene naphthalate) that is capable of yielding an optical efficacy of at least about 0.10. The second optical layers have a lower in-plane birefringence than the first optical layers for 632.8 nm light. Optical efficacy is defined as $(n_z - n_y)^2 / (n_x - n_y)^2$, where $n_x$, $n_y$, and $n_z$ are the indices of refraction of the optical layer.

The above summary of the present invention is not intended to describe each disclosed embodiment or every implementation of the present invention. The Figures and the detailed description which follow exemplify several embodiments.

BRIEF DESCRIPTION OF THE DRAWINGS

The invention may be more completely understood in consideration of the following detailed description of various embodiments of the invention in connection with the accompanying drawings, in which.

Figure 1:
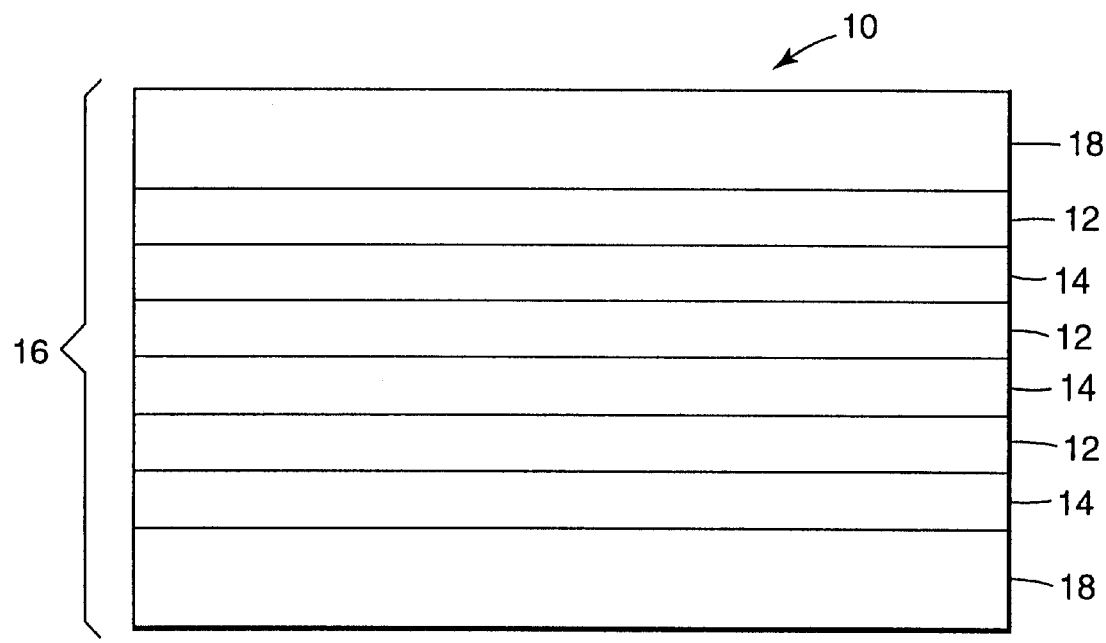
FIG. 1 is a cross-sectional view of one embodiment of a multilayer optical film, according to the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention is believed to be applicable to optical bodies (such as optical films) and their manufacture, as well as the use of the optical bodies in optical devices, such as polarizers and mirrors. The present invention is also directed to optical bodies (such as optical films including multilayer optical films) having birefringent layers of co-polyethylene naphthalate (coPEN) and methods of making and using these optical bodies, as well as articles incorporating the optical bodies. While the present invention is not so limited, an appreciation of various aspects of the invention will be gained through a discussion of the examples provided below.

The term "birefringent" means that the indices of refraction in orthogonal x, y, and z directions are not all the same. For the polymer layers described herein, the axes are selected so that x and y axes are in the plane of the layer and the z axis corresponds to the thickness or height of the layer.

The term "in-plane birefringence" will be understood to be the absolute value of the difference between the in-plane indices ($n_x$ and $n_y$) of refraction.

The term "polymer" will be understood to include both polymers and copolymers, as well as polymers or copolymers which can be formed in a miscible blend by, for example, coextrusion or reaction, including transesterification. Both block and random copolymers are included, unless indicated otherwise.

All birefringence and index of refraction values are reported for 632.8 nm light unless otherwise indicated.

Reference to "X mol % naphthalate content" indicates a polyester in which only X mol % of the carboxylate subunits of the polyester are naphthalate subunits.

In general, optical bodies can be made using at least two polymeric materials that form a reflective interface for at least one polarization of light. Typically, at least one of these polymeric materials is birefringent upon orientation (e.g., stretching). One suitable optical body is a multilayer optical film containing layers of each of the polymeric materials interleaved to form multiple reflective interfaces.

Multilayer Optical Films

Figure 2:
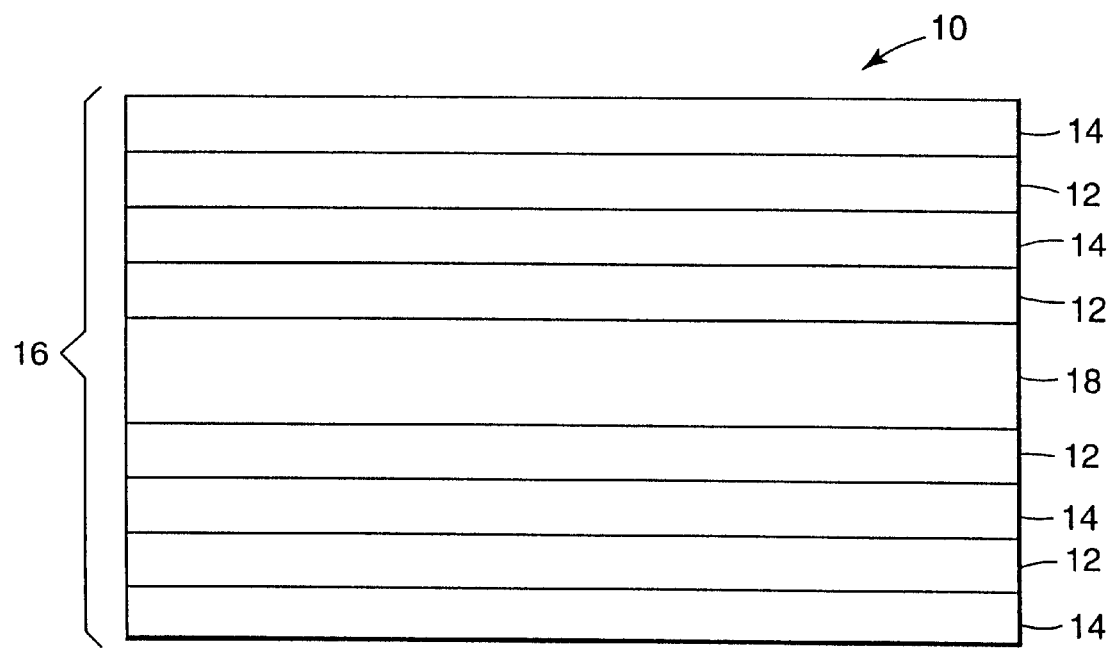
FIG. 2 is a cross-sectional view of another embodiment of a multilayer optical film, according to the invention.

FIGS. 1 and 2 illustrate multilayer optical films 10 which can be used, for example, as an optical polarizer or mirror.

The films 10 include one or more first optical layers 12, one or more second optical layers 14, and one or more non-optical layers 18. The non-optical layers 18 can be disposed on a surface of the optical film as a skin layer (FIG. 1) or disposed between optical layers (FIG. 2). The first optical layers 12 are preferably birefringent polymer layers that are uniaxially- or biaxially-oriented. In some embodiments, the second optical layers 14 are polymer layers that are birefringent and uniaxially- or biaxially-oriented. In other embodiments, the second optical layers 14 are polymer layers having an isotropic index of refraction that is different from at least one of the indices of refraction of the first optical layers 12. In either case, the second optical layers are selected to have an in-plane birefringence that is less than the in-plane birefringence of the first optical layers for 632.8 nm light. Although, the present invention will be exemplified using films 10 with second optical layers 14 that have an isotropic index of refraction, the principles and examples described herein can be applied to multilayer optical films with second optical layers 14 that are birefringent.

The optical layers 12, 14 and, optionally, one or more of the non-optical layers 18 are typically interleaved to form a stack 16 of layers. Typically the optical layers 12, 14 are arranged as alternating pairs, as shown in FIG. 1, to form a series of interfaces between layers with different optical properties. The optical layers 12, 14 are typically no more than 1 μm thick and may be no more than 400 nm thick.

Although FIG. 1 shows only six optical layers 12, 14, multilayer optical films 10 can have a large number of optical layers. Examples of suitable multilayer optical films include those having about 2 to 5000 optical layers. Generally, multilayer optical films have about 25 to 2000 optical layers and typically about 50 to 1500 optical layers or about 75 to 1000 optical layers. It will be appreciated that, although only a single stack 16 is illustrated in FIG. 1, the multilayer optical film 10 can be made from multiple stacks that are subsequently combined to form the film 10.

Additional sets of optical layers, similar to the first and second optical layers 12, 14, can also be used in the multilayer optical film 10. The design principles disclosed herein for the sets of first and second optical layers can be applied to any additional sets of optical layers.

The first optical layers 12 are orientable films that can be made birefringent by, for example, stretching the first optical layers 12 in a desired direction or directions. The first optical layers 12 can be uniaxially-oriented by, for example, stretching the layers in a single direction. A second orthogonal direction may be allowed to neck (e.g., decrease in length, width, or thickness) into some value less than its original length. The direction of stretching can substantially correspond to either in-plane axis (e.g. the x or y axis), however, other directions can be chosen. A birefringent, uniaxially-oriented film typically exhibits a difference between the transmission and/or reflection of incident light rays having a plane of polarization parallel to the oriented direction (i.e., stretch direction) and light rays having a plane of polarization parallel to a transverse direction (i.e., a direction orthogonal to the stretch direction). For example, when an orientable polyester film is stretched along the x axis, the typical result is that $n_x \neq n_y$, where $n_x$ and $n_y$ are the indices of refraction for light polarized in a plane parallel to the "x" and "y" axes, respectively. The degree of alteration in the index of refraction along the stretch direction will depend on factors such as, for example, the amount of stretching, the stretch rate, the temperature of the film during stretching, the thickness of the film, the variation in the film thickness, and the composition of the film. Typically, the first optical layers 12 have an in-plane birefringence (the absolute value of $n_x-n_y$) after orientation of 0.1 or greater for 632.8 nm light and generally about 0.16 or greater. Preferably, the in-plane birefringence for 632.8 nm light is about 0.18 or greater, more preferably, about 0.19 or greater, and, even more preferably, about 0.20 or greater.

A polarizer can be made by combining a uniaxially-oriented first optical layer 12 with a second optical layer 14 having an isotropic index of refraction that is approximately equal to one of the in-plane indices of the oriented layer. Alternatively, both optical layers 12,14 are formed from birefringent polymers and are oriented in a multiple draw process so that the indices of refraction in a single in-plane direction are approximately equal. The interface between the two optical layers 12,14, in either case, forms a light reflection plane. Light polarized in a plane parallel to the direction in which the indices of refraction of the two layers are approximately equal will be substantially transmitted. Light polarized in a plane parallel to the direction in which the two layers have different indices will be at least partially reflected. The reflectivity can be increased by increasing the number of layers or by increasing the difference in the indices of refraction between the first and second optical layers 12, 14.

For polarizers having second optical layers with isotropic indices of refraction or low in-plane birefringence (e.g., no more than about 0.07), the in-plane indices ($n_x$ and $n_y$) of refraction of the second optical layers are approximately equal to one in-plane index (e.g., $n_y$) of the first optical layers. Thus, the in-plane birefringence of the first optical layers is an indicator of the reflectivity of the multilayer optical film. Typically, it is found that the higher the in-plane birefringence, the better the reflectivity of the multilayer optical film. If the out-of-plane indices ($n_z$) of refraction of the first and second optical layers are equal or nearly equal (e.g., no more than 0.1 difference and preferably no more than 0.05 difference), the multilayer optical film also has less off-angle color. Off-angle color arises from non-uniform transmission of light at angles other than normal to the plane of the multilayer optical film. Typically, the highest reflectivity for a particular interface occurs at a wavelength corresponding to twice the combined optical thickness of the pair of optical layers 12, 14 which form the interface. The optical thickness describes the difference in path length between light rays reflected from the lower and upper surfaces of the pair of optical layers. For light incident at 90 degrees to the plane of the optical film (normally incident light), the optical thickness of the two layers is $n_1d_1+n_2d_2$ where $n_1$, $n_2$ are the z-axis indices of refraction of the two layers and $d_1$, $d_2$ are the thicknesses of the corresponding layers. This equation can be used to tune the optical layers for normally incident light using only a single out-of-plane (e.g., $n_z$) index of refraction for each layer. At other angles, the optical distance depends on the distance traveled through the layers (which is larger than the thickness of the layers) and the indices of refraction for at least two of the three optical axes of the layer. The layers 12, 14 can each be a quarter wavelength thick or the layers 12, 14 can have different optical thicknesses, as long as the sum of the optical thicknesses is half of a wavelength (or a multiple thereof). A film having more than two optical layers can include optical layers with different optical thicknesses to increase the reflectivity of the film over a range of wavelengths. For example, a film can include pairs or sets of layers that are individually tuned to achieve optimal reflection of normally incident light having particular wavelengths.

In other embodiments, the first optical layers 12 can be biaxially-oriented by stretching in two different directions. The stretching of optical layers 12 in the two directions may result in a net symmetrical or asymmetrical stretch in the two chosen orthogonal axes. One example of the formation of a mirror is the combination of a biaxially-oriented optical layer 22 with a second optical layer 24 having indices of refraction which differ from both the in-plane indices of the biaxially-oriented layer. The mirror operates by reflecting light having either polarization because of the index of refraction mismatch between the two optical layers 12, 14. Mirrors can also be made using a combination of uniaxially-oriented layers with in-plane indices of refraction which differ significantly. There are other methods and combinations of layers that are known for producing both mirrors and polarizers and which may be used. Those particular combinations discussed above are examples.

The optical layers 12, 14 and the non-optical layers 18 of the multilayer optical film 10 are typically composed of polymers such as polyesters. Non-polyester polymers are also useful in creating polarizer or mirror films. Polyesters include carboxylate and glycol subunits and can be generated by, for example, (a) reaction of carboxylate monomer molecules with glycol monomer molecules or (b) transesterification. Each carboxylate monomer molecule has two or more carboxylic acid or ester functional groups and each glycol monomer molecule has two or more hydroxy functional groups. Polyesters can be formed using a single type of carboxylate monomer molecule or two or more different types of carboxylate monomer molecules. The same applies to the glycol monomer molecules. Also included within the term "polyester" are polycarbonates which are derived from the reaction of glycol monomer molecules with esters of carbonic acid.

The properties of a polymer layer or film vary with the particular choice of monomer molecules. Suitable carboxylate monomer molecules for forming the carboxylate subunits of a polyester layer include, for example, 2,6-naphthalene dicarboxylic acid and isomers thereof; terephthalic acid; isophthalic acid; phthalic acid; azelaic acid; adipic acid; sebacic acid; norbornene dicarboxylic acid; bi-cyclooctane dicarboxylic acid; 1,6-cyclohexane dicarboxylic acid and isomers thereof; t-butyl isophthalic acid; tri-mellitic acid; sodium sulfonated isophthalic acid; 2,2'-biphenyl dicarboxylic acid and isomers thereof; and lower alkyl esters of these acids, such as methyl or ethyl esters. The term "lower alkyl" refers, in this context, to C1–C10 straight-chained or branched alkyl groups.

Suitable glycol monomer molecules for forming glycol subunits of a polyester layer include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis(2-hydroxyethoxy)benzene.

First Optical Layers

The first optical layers 12 are orientable films of a polymer (e.g., a copolymer of polyethylene naphthalate (coPEN)), that can be made birefringent by, for example, stretching the first optical layers 12 in a desired direction or directions. Typically, birefringent optical layers have been made using materials with relatively high crystallinity. These crystalline materials can be made birefringent by orientation (for example, stretching the film at a temperature substantially above the glass transition temperature of the first optical layers). Polyethylene naphthalate (PEN) has a relatively high crystallinity (about 50%) and has a relatively large birefringence upon orientation (e.g., an in-plane birefringence of about 0.22 to 0.24).

Figure 3:
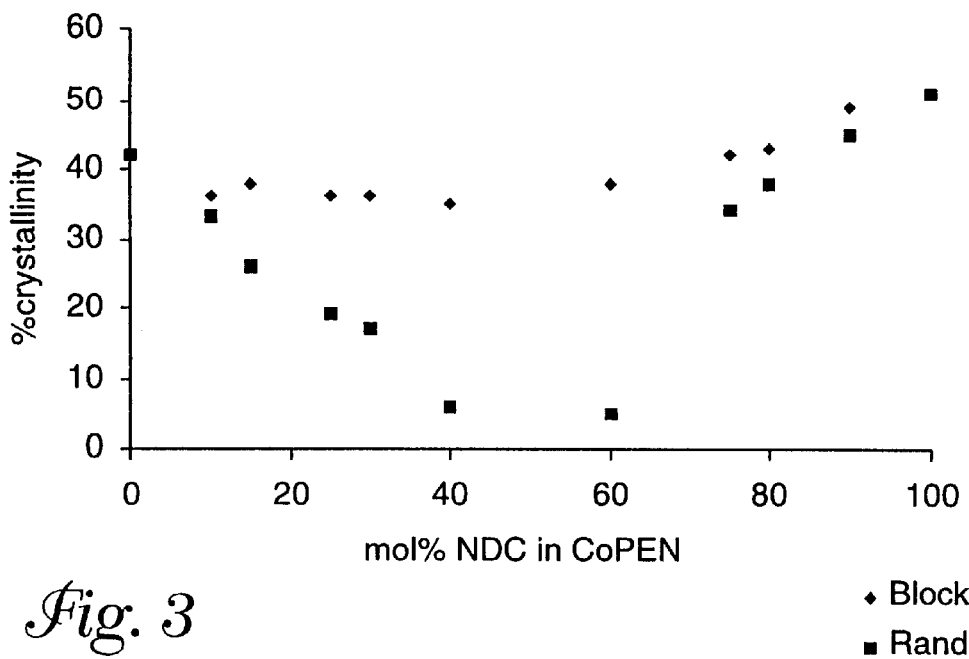
FIG. 3 is a graph of percent crystallinity of terephthalate-containing random (squares) and block (diamonds) copolymers of polyethylene naphthalate.

Copolymers of PEN typically have lower crystallinity than PEN. FIG. 3 is a graph of crystallinity for random and block copolymers of PEN containing terephthalate subunits. The crystallinity was measured using differential scanning calorimetry (DSC). One method of determining crystallinity includes measuring heats of fusion using a DSC according to ASTM E 793-95. Percent crystallinity (%C) is then calculated by the following equation:

$$\%C = (H_{sample} * (1+R))/(H_1 + R*H_2)$$

where $H_{sample}$ is the heat of fusion of the sample, $H_1$ is the heat of fusion for completely crystallized PET (polyethylene terephthalate) [about 126 J/g], $H_2$ is the heat of fusion for completely crystallized PEN (polyethylene naphthalate) [about 103 J/g], and R is the ratio of naphthalate subunits to terephthalate subunits.

The random copolymers represented in FIG. 3 were made by reaction of appropriate naphthalate, terephthalate, and ethylene glycol monomer materials in the requisite proportions. The block copolymers represented in FIG. 3 were made by extrusion blending and transesterification of PEN (or coPEN) and PET (polyethylene terephthalate) (or coPET) in the desired proportions. The amount of transesterification can depend on a variety of factors such as, for example, processing temperature, processing time, residence time in an extruder or other processing equipment, and the composition of the starting materials (e.g., the composition of PEN, coPEN, PET, or coPET used as a starting material).

Figure 4:
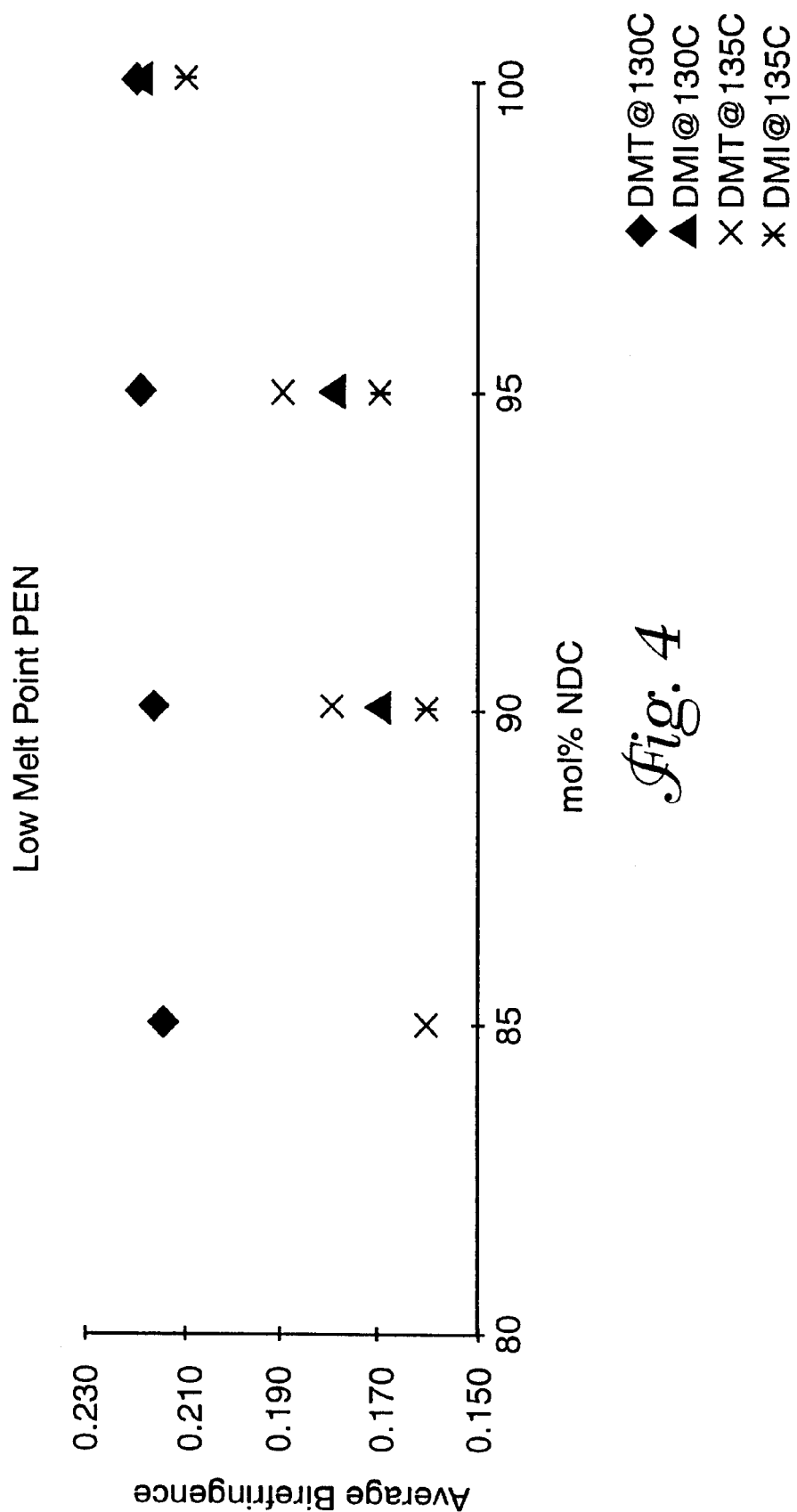
FIG. 4 is a graph of birefringence for copolymers of polyethylene naphthalate formed using dimethyl terephthalate (DMT) (diamonds—orientation at 130° C., X's—orientation at 135° C.) and dimethyl isophthalate (DMI) (triangles—orientation at 130° C., asterisks—orientation 135° C.) and different naphthalate content (mol % NDC)

FIG. 3 shows that the crystallinity of PEN copolymers decreases with increasing substitution of the naphthalate subunits by terephthalate subunits until about 40 mol % of the naphthalate remains. In addition, there appears to be a large decrease in crystallinity (from substantially above 30% to less than 10%) for random copolymers between about 60 and 75 mol % naphthalate content. The decrease in crystallinity of random copolymers of PEN corresponds to an observed decrease in the birefringence of these polymers over the range of 85 to 100 mol % naphthalate content, as illustrated in FIG. 4. Because of this trend of decreasing birefringence with decreasing naphthalate content, and particularly because of the large reduction in crystallinity between 60 and 75 mol % naphthalate content, it was believed that random copolymers with less than about 70 mol % naphthalate content (e.g., low naphthalate content coPENs) would be less suitable for use in the first optical layers.

Moreover, with respect to block copolymers of PEN, it was thought that the addition of PET would lower the overall birefringence substantially. PET has a birefringence of only 1.11 for 632.8 nm light.

Figure 5:
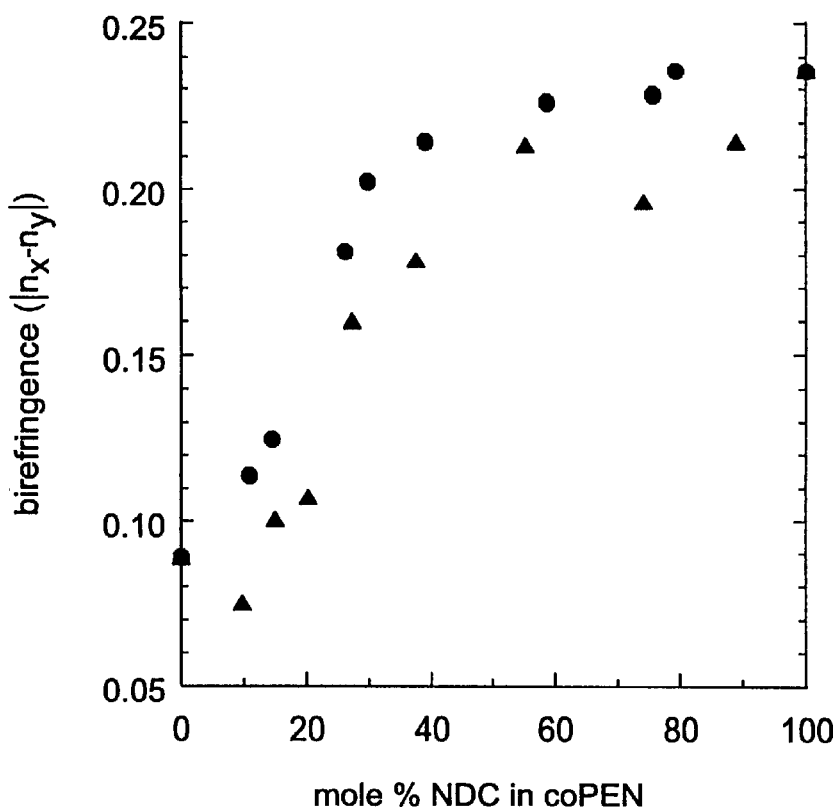
FIG. 5 is a graph of birefringence for terephthalate-containing random (circles) and block (triangles) copolymers of polyethylene naphthalate.

Surprisingly, it was found that, despite the formation of less crystalline polymers and/or the use of PET as a starting material, an in-plane birefringence of about 0.18 or 0.19 or higher could be obtained for coPENs with less than 70 mol % naphthalate content. It was found that block coPENs still retained sufficient birefringence and crystallinity despite the use of PET as a starting material. Moreover, the decrease in birefringence with decreasing naphthalate content was less than expected for random coPENs with between about 20 and 70 mol % naphthalate content. FIG. 5 is a graph of the birefringence for a variety of terephthalate-containing random (circles) and block (triangles) coPENs that have been stretched at temperatures and draw ratios that give the best measured birefringence.

Previously, orientation of multilayer optical films was typically achieved by stretching the polymer films at a temperature that was at least about 10 to 20° C. greater than the glass transition temperature of the polymer of the first optical layers. Lower temperatures, including those at or below the glass transition temperature, were not used because stretching resulted in the formation of voids in the film (e.g., crazing of the film) due, at least in part, to excessive strain hardening of the film and crystallization of the polymer. This prevented further stretching of the film. Thus, the amount of stretching was limited by the orientation temperature and the crystallinity of the material. In some instances, the films even cracked or broke under low temperature stretching. At these temperatures, stretching reduced the transparency of the polymer film, resulting in translucent or white regions.

In contrast, for random coPENs with less than 70 mol % naphthalate content it is believed that the amorphous regions of these polymer films are oriented during stretching at temperatures no more than 5° C. above or, if desired, at or below the glass transition temperature of the polymer. Higher temperatures typically result in less orientation and lower birefringence of amorphous regions of the polymers. Because the crystallinity of the low naphthalate content random copolymer is relatively low (generally no more than about 25 wt. % and typically about 20 wt. % or less), there appears to be little crystallization or strain hardening of the film during stretching. This allows the film to be stretched at a lower temperature and to a larger draw ratio than a coPEN film with 70 mol % or more naphthalate content as illustrated in the following table for about 12 to 25 nm thick coPEN films.

TABLE 1

Properties of Oriented CoPEN Films

|  | Naphthalate Content (mol %)[a] | Transesterification (%) (ca)[b] | Draw Temp. (° C.)[c] | Draw Ratio | Crystallinity (%) (ca)[d] | Δn ($|n_x - n_y|$) | Δn ($|n_z - n_y|$) |
|---|---|---|---|---|---|---|---|
| PEN | 100 | — | 19 | 5.0:0.9 | 51.3 | 0.2355 | 0.1006 |
| Random CoPEN | 79.4 | 82.2 | 114 | 5.9:1.0 | 37.7 | 0.2356 | 0.0860 |
|  | 75.5 | 92.5 | 114 | 5.8:0.9 | 34.1 | 0.2284 | 0.0754 |
|  | 58.4 | 98.3 | 109 | 7.2:1.0 | 5.2 | 0.2260 | 0.0750 |
|  | 39.1 | 99.8 | 99 | 6.7:1.0 | 5.7 | 0.2146 | 0.0390 |
|  | 29.9 | 99.0 | 94 | 5.5:0.9 | 17.0 | 0.2021 | 0.0290 |

TABLE 1-continued

Properties of Oriented CoPEN Films

| | Naphthalate Content (mol %)[a] | Trans-esterification (%) (ca)[b] | Draw Temp. (° C.)[c] | Draw Ratio | Crystallinity (%) (ca)[d] | $\Delta n$ ($|n_x - n_y|$) | $\Delta n$ ($|n_z - n_y|$) |
|---|---|---|---|---|---|---|---|
| | 26.2 | 100.5 | 94 | 5.3:1.0 | 18.9 | 0.1812 | 0.0315 |
| | 14.4 | 105.3 | 94 | 5.0:1.0 | 26.1 | 0.1250 | 0.0348 |
| | 10.9 | 103.1 | 94 | 5.0:0.9 | 33.0 | 0.1142 | 0.0324 |
| Block | 88.9 | 10.1 | 119 | 4.5:1.0 | 48.6 | 0.2144 | 0.0905 |
| CoPEN | 74.0 | 10.2 | 114 | 4.7:1.0 | 41.6 | 0.1959 | 0.0722 |
| | 55.3 | 9.4 | 104 | 5.3:0.9 | 38.1 | 0.2132 | 0.0529 |
| | 37.7 | 9.7 | 99 | 5.0:1.0 | 35.0 | 0.1782 | 0.0421 |
| | 27.3 | 9.2 | 99 | 5.0:0.8 | 36.4 | 0.1603 | 0.0313 |
| | 20.3 | 25.2 | 104 | 5.6:1.0 | 36.2 | 0.1070 | 0.0321 |
| | 15.0 | 15.3 | 104 | 5.9:1.0 | 38.3 | 0.1007 | 0.0294 |
| | 9.7 | 13.7 | 104 | 6.7:1.0 | 35.5 | 0.0750 | 0.0263 |
| PET | 0 | — | 94 | 4.9:0.9 | 42.2 | .0892 | 0.0283 |

[a]Mole percent naphthalate was measured by NMR
[b]Transesterification percentages were calculated from measured NMR data
[c]The draw temperature is the temperature of air in a tenter. The film was radiatively heated, so the film temperature is different than the draw temperature.
[d]Crystallinity percentages were calculated from the DSC measurements of the heat of fusion Other properties of the multilayer optical film can also be improved using low naphthalate content coPENs in the first optical layers. Table 1 provides measures of $\Delta x$ (defined as $|n_x-n_y|$) and $\Delta z$ (defined as $|n_z-n_y|$) for the coPEN films. $\Delta x$ corresponds to the in-plane birefringence of the coPEN film. $\Delta z$ is a measure of the difference in z-axis indices of refraction between first and second optical layers, assuming that the second optical layer is isotropic or nearly isotropic and the y-axis indices of the first and second optical layers are matched or nearly matched. This measure is useful in preparing polarizers with reduced off-angle color. Matching z axis indices of refraction of the first and second optical layers permits more uniform transmission, through the multilayer optical film, of light incident at angles less than 90 degrees with respect to the plane of the film.

Figure 6:
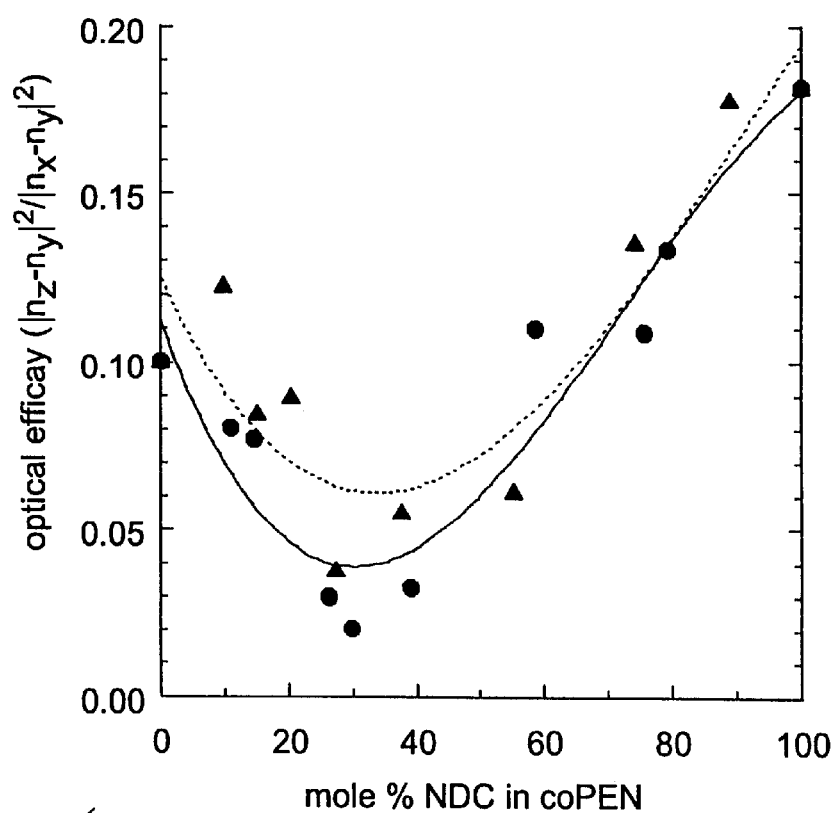
FIG. 6 is a graph of optical parameters for terephthalate-containing random (circles, solid line) and block (triangles, dotted line) copolymers of polyethylene naphthalate.

FIG. 6 illustrates the optical efficacy of terephthalate-containing random (circles) and block (triangles) coPEN films of Table 1. The optical efficacy is represented by $(\Delta z)^2/(\Delta x)^2$ which corresponds to an estimation of the relative amount of off-angle color for a given amount of birefringence (e.g., reflective power). This graph indicates that both random and block coPENs with less than 70 mol % naphthalate content appear to have substantially less off-angle color relative to their birefringence than coPENs with higher naphthalate content. Preferably, the optical efficacy $((\Delta z)^2/(\Delta x)^2)$ is no more than about 0.20 and, more preferably, the optical efficacy is no more than about 0.10, and, most preferably, no more than about 0.08.

In addition, the z axis index of refraction of terephthalate-containing coPENs with low naphthalate content better matches the z axis index of refraction of suitable second optical layer materials like, for example, PETG (an amorphous copolymer of polyethylene terephthalate from Eastman Chemical Co., Kingsport, Tenn.) or a copolymer of polyethylene terephthalate (coPET) containing 70 mol % terephthalate and 30 mol % cyclohexanate carboxylate subunits and 99.5 mol % ethylene glycol and 0.5 mol % trimethylol propane glycol subunits. As an example of a previously used combination, PEN has a z axis index of refraction of about 1.51. A second optical layer used with PEN is an isophthalate-containing coPEN with 70 mol % naphthalate content which has a z axis index of refraction of about 1.625. This is a difference of about 0.11. This combination is selected to provide matching of the y axis indices of refraction for transmission.

In contrast, a terephthalate-containing coPEN with 40 mol % naphthalate content has a z axis index of refraction of about 1.53. PETG has a z axis index of refraction of 1.57 and the cyclohexanate-containing coPET described above has a z axis index of refraction of about 1.55. This is a difference of about 0.04 and 0.02, respectively. Other materials with different z axis indices of refraction could be matched with appropriate low naphthalate content coPENs. Preferably, the z axis index of refraction between the first and second optical layers is no more than about 0.07 and, more preferably, no more than about 0.05.

Figure 7:
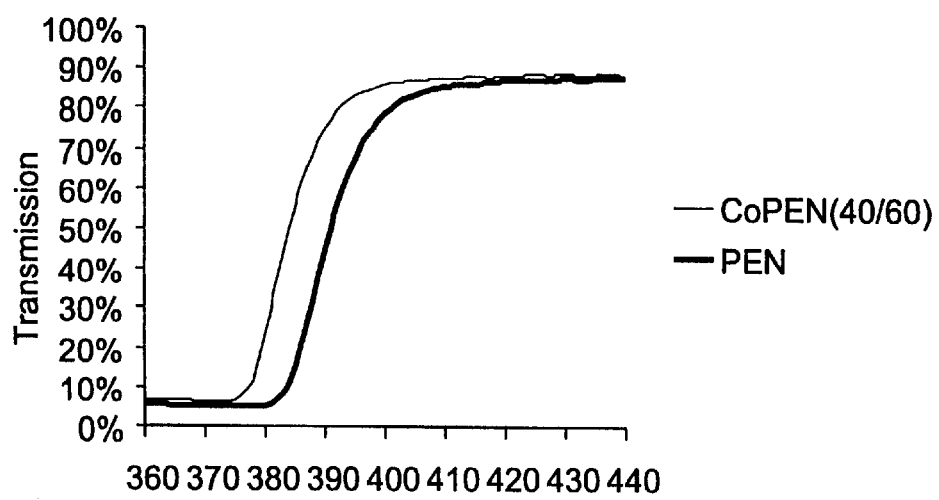
FIG. 7 is a graph comparing transmission spectra of polyethylene naphthalate (heavy line) with a terephthalate-containing random copolymer of polyethylene naphthalate having 40 mol % naphthalate content (light line).

Another potential advantage is that at least some low naphthalate content coPENs can be more satisfactorily stabilized from UV degradation than PEN or higher naphthalate content coPENs. FIG. 7 illustrates the transmission spectra for PEN (heavy line) and terephthalate-containing coPEN (light line) having 40 mol % naphthalate content. These spectra illustrate that the absorption band of the coPEN is shifted to lower wavelengths than the absorption band of PEN. This indicates that the coPEN will be less degraded by light, including UV light, in the range of about 380 to 400 nm. The absorption bands of coPENs with even lower naphthalate content will be shifted toward lower wavelengths. This shifting of the absorption bands to lower wavelengths permits the use of UVA (ultraviolet absorbing) protective layers that do not need to extend as far into the visible range, thereby reducing the yellow appearance (due to absorption of blue light) of these protective layers.

The first optical layers of the multilayer optical films of the present invention generally include a copolymer of polyethylene naphthalate (PEN). Suitable copolymers of PEN for use in the first optical layers are typically orientable to provide an in-plane birefringence of at least about 0.19 and, preferably, about 0.20. Suitable low naphthalate content copolymers include those having less than 70 wt. % naphthalate content, typically between 20 to 70 mol % naphthalate content. Preferably, these copolymers have about 25 to 65 mol % naphthalate content and, more preferably, about 30 to 60 mol % naphthalate content. Suitable copolymers also include copolymers of PEN that have no more than about 20% crystallinity, as determined using DSC measurements. Suitable copolymers also include copolymers that can be oriented at a temperature that is no more than about 5° C. above the glass transition temperature or, if desired, at a temperature that is no more than the glass transition temperature, to provide suitable in-plane birefringence. Glass transition temperatures can be measured according to ASTM D 3418-97. Glass transition temperatures can be dependent on relative humidity. Preferably, the glass transition temperature is determined for a sample at about 0% relative humidity.

Suitable comonomers for use in the coPENs of the first optical layer include, for example, terephthalate, isophthalate, biphenylbibenzoate, and cyclohexanate. Although the use of low naphthalate content copolymers of polyethylene naphthalate as birefringent first optical layers is described above, other polymers with similar properties (e.g., orientability at temperatures slightly above or equal to or below the glass transition temperature or low crystallinity) can also be used.

Second Optical Layers

The second optical layers 14 can be prepared with a variety of optical properties depending, at least in part, on the desired operation of the film 10. In one embodiment, the second optical layers 14 are made of a polymer material that does not appreciably optically orient when stretched under conditions that are used to orient the first optical layers 12. Such layers are particularly useful in the formation of reflective polarizing films, because they allow the formation of a stack 16 of layers by, for example, coextrusion, which can then be stretched to orient the first optical layers 12 while the second optical layers 14 remain relatively isotropic (e.g., in-plane birefringence of 0.05 or less). Typically, the index of refraction of the second optical layers 14 is approximately equal to one of the in-plane indices of the oriented first optical layers 12 to allow transmission of light with a polarization in a plane parallel to the direction of the matched indices. Preferably, in this embodiment, the two approximately equal indices of refraction differ by about 0.05 or less, and more preferably by about 0.02 or less, for 632.8 nm light. In one embodiment, the index of refraction of the second optical layers 14 is approximately equal to the index of refraction of the first optical layers 12 prior to stretching.

In other embodiments, the second optical layers 14 are orientable. In some cases, the second optical layers 14 have one in-plane index of refraction that is substantially the same as the corresponding index of refraction of the first optical layers 12 after orientation of the two sets of layers 12, 14, while the other in-plane index of refraction is substantially different than that of the first optical layers 12. In other cases, particularly for mirror applications, both in-plane indices of refraction of the optical layers 12, 14 are substantially different after orientation.

The second optical layers 14 can be made using a variety of polymers. Examples of suitable polymers include vinyl polymers and copolymers made from monomers such as vinyl naphthalenes, styrene, maleic anhydride, acrylates, and methacrylates. Examples of such polymers include polyacrylates, polymethacrylates, such as poly(methyl methacrylate) (PMMA), and isotactic or syndiotactic polystyrene. Other polymers include condensation polymers such as polysulfones, polyamides, polyurethanes, polyamic acids, and polyimides. In addition, the second optical layers 14 may be formed from polymers such as polyesters and polycarbonates. The second optical layers 14 will be exemplified below by copolymers of polyesters. However, it will be understood that the other polymers described above may also be used. The same considerations with respect to optical properties for the copolyesters, as described below, will also typically be applicable for the other polymers and copolymers.

Examples of suitable materials for the second optical layers 14 are copolymers of PEN, PBN (polybutylene naphthalate), PET (polyethylene terephthalate), and PBT (polybutylene terephthalate). Examples of suitable polyesters with low birefringence are described in, for example, PCT Publications WO 99/36262 and WO 99/36812, incorporated herein by reference. Included in the suitable polymers are amorphous copolymers, particularly those that do not substantially orient or become birefringent under the conditions used to orient the first optical layers. Commercial examples of suitable polyesters with low birefringence upon orientation of the first optical layers include modified coPET's, such as PETG and PCTG from Eastman Chemical Co., Kingsport, Tenn.

Low birefringent polyesters can be synthesized by the addition of comonomer materials. Examples of suitable birefringent-reducing comonomer materials for use as diol subunits are derived from aliphatic diols, such as, for example, 1,6-hexanediol, trimethylol propane, pentaerythritol, cyclohexane dimethanol, 1,4-butanediol, and neopentyl glycol. Examples of suitable birefringent-reducing comonomer materials for use as carboxylate subunits are derived from aliphatic diacids, such as, for example, cyclohexane dicarboxylic acids, and aromatic diacids, such as, for example, t-butyl-isophthalic acid, phthalic acid, and lower alkyl esters thereof.

Non-Optical Layers

Referring again to FIGS. 1 and 2, one or more of the non-optical layers 18 can be formed as a skin layer or skin layers over at least one surface of stack 16 as illustrated in FIG. 1, to, for example, protect the optical layers 12, 14 from physical damage during processing and/or afterwards. In addition or alternatively, one or more of the non-optical layers 18 can be formed within the stack 16 of layers, as illustrated in FIG. 2, to, for example, provide greater mechanical strength to the stack or to protect the stack during processing.

The non-optical layers 18 ideally do not significantly participate in the determination of optical properties of the multilayer optical film 10, at least across the wavelength region of interest. The non-optical layers 18 are typically not birefringent or. orientable, but in some cases this may not be true. Typically, when the non-optical layers 18 are used as skin layers there will be at least some surface reflection. If the multilayer optical film 10 is to be a polarizer, the non-optical layers preferably have an index of refraction that is relatively low. This decreases the amount of surface reflection. If the multilayer optical film 10 is to be a mirror, the non-optical layers 18 preferably have an index of refraction which is high, to increase the reflection of light.

When the non-optical layers 18 are found within the stack 16, there will typically be at least some polarization or reflection of light by the non-optical layers 18 in combination with the optical layers 12, 14 adjacent to the non-optical layers 18. In at least some instances, however, the non-optical layers 18 can be selected to have a thickness that dictates that light reflected by the non-optical layers 18 within the stack 16 has a wavelength outside the region of interest, for example, in the infrared region for visible light polarizers or mirrors. The thickness of the non-optical layers 18 can be at least two times, typically at least four times, and, in many instances, at least ten times, the thickness of one of the individual optical layers 12, 14. The thickness of the non-optical layers 18 can be varied to make a multilayer optical film 10 having a particular thickness. Typically, one or more of the non-optical layers 18 are placed so that at least a portion of the light to be transmitted, polarized, and/or reflected by the optical layers 12, 14, also travels through the non-optical layers (i.e., the non-optical layers are placed in the path of light which travels through or is reflected by the optical layers 12, 14).

The non-optical layers 18 are formed from polymers, such as polyesters, including any of the polymer described above for use in the first and second optical layers. In some embodiments, the material selected for the non-optical layers 18 is similar to or the same as the material selected for the second optical layers 14. The use of coPEN, coPET, or other copolymer material for skin layers reduces the splittiness (i.e., the breaking apart of a film due to strain-induced crystallinity and alignment of a majority of the polymer molecules in the direction of orientation) of the multilayer optical film. The coPEN of the non-optical layers typically orients very little when stretched under the conditions used to orient the first optical layers 12 and so there is little strain induced crystallinity.

Other Layers and Coatings

Various functional layers or coatings can be added to the films and optical devices of the present invention to alter or improve their physical or chemical properties, particularly along the surface of the film or device. Such layers or coatings may include, for example, slip agents, low adhesion backside materials, conductive layers, antistatic coatings or films, barrier layers, flame retardants, UV stabilizers, abrasion resistant materials, optical coatings, and/or substrates designed to improve the mechanical integrity or strength of the film or device. Dichroic polarizing films can also be coated on or co-extruded with the multilayer optical films, as described, for example, in WO 95/17691, WO 99/36813, and WO 99/36814, all of which are herein incorporated by reference.

Skin layers or coatings can also be added to impart desired barrier properties to the resulting film or device. Thus, for example, barrier films or coatings can be added as skin layers, or as a component in skin layers, to alter the transmissive properties of the film or device towards liquids, such as water or organic solvents, or gases, such as oxygen or carbon dioxide. Thus, for example, the devices and films can be provided with films or coatings that inhibit the transmission of water vapor, organic solvents, $O_2$, or $CO_2$ through the film. Barrier coatings can be particularly desirable in high humidity environments, where components of the film or device may be subject to distortion due to moisture permeation.

Skin layers or coatings can also be added to impart or improve abrasion resistance in the resulting article. Thus, for example, a skin layer containing particles of, for example, silica, alumina, silica-alumina alloys, or amorphous polymers embedded in a polymer matrix can be added to an optical film to impart abrasion resistance to the film, provided, of course, that such a layer does not unduly compromise the optical properties required for the application to which the film is directed. Particles in a skin layer or coating can also be used to prevent or reduce wet-out or Newton's rings when the multilayer optical film is placed next to another film or surface and these particles can also act as diffusers, as described in U.S. patent application Ser. No. 09/399,531, incorporated herein by reference.

Skin layers or coatings can also be added to impart or improve puncture and/or tear resistance in the resulting article. Factors to be considered in selecting a material for a tear resistant layer include percent elongation to break, Young's modulus, tear strength, adhesion to interior layers, percent transmittance and absorbence in an electromagnetic bandwidth of interest, optical clarity or haze, refractive indices as a function of frequency, texture and roughness, melt thermal stability, molecular weight distribution, melt rheology and coextrudability, miscibility and rate of interdiffusion between materials in the skin and optical layers, viscoelastic response, relaxation and crystallization behavior under draw conditions, thermal stability at use temperatures, weatherability, ability to adhere to coatings, and permeability to various gases and solvents. Puncture or tear resistant skin layers may be applied during the manufacturing process or later coated onto or laminated to the multilayer optical film. Adhering these layers to the film during the manufacturing process, such as by a coextrusion process, provides the advantage that the film is protected during the manufacturing process. In some embodiments, one or more puncture or tear resistant layers are provided within the film, either alone or in combination with a puncture or tear resistant skin layer.

The multilayer optical films can be given good slip properties by treating them with low friction coatings or slip agents, such as polymer beads coated onto the surface. Alternately, the morphology of the surfaces of these materials can be modified, as through manipulation of extrusion conditions, to impart a slippery surface to the film; methods by which surface morphology may be so modified are described in U.S. Pat. No. 5,759,467 and U.S. patent application Ser. No. 09/399,531, incorporated herein by reference.

In some applications, as where the multilayer optical films are to be used as a component in adhesive tapes, it may be desirable to treat the films with low adhesion backsize (LAB) coatings or films such as, for example, those based on urethane, silicone or fluorocarbon chemistry. Films treated in this manner can exhibit proper release properties towards pressure sensitive adhesives (PSAs), thereby enabling them to be treated with adhesive and wound into rolls. Adhesive tapes made in this manner can be used for decorative purposes or in any application where a diffusely reflective or transmissive surface on the tape is desirable.

The multilayer optical films can also be provided with one or more conductive layers. Such conductive layers can include, for example, metals (such as silver, gold, copper, aluminum, chromium, nickel, tin, and titanium), metal alloys (such as silver alloys, stainless steel, and inconel), and semiconductor metal oxides (such as doped and undoped tin oxides, zinc oxide, and indium tin oxide (ITO)).

The multilayer optical films can also be provided with antistatic coatings or films. Such coatings or films include, for example, $V_2O_5$ and salts of sulfonic acid polymers, carbon, or other conductive metal layers.

The multilayer optical films can also be treated with flame retardants, particularly when used in environments, such as on airplanes, that are subject to strict fire codes. Suitable flame retardants include, for example, aluminum trihydrate, antimony trioxide, antimony pentoxide, and flame retarding organophosphate compounds.

The multilayer optical films can also be provided with abrasion-resistant or hard coatings, which may be applied as a skin layer. These include, for example, acrylic hardcoats such as Acryloid A-11 and Paraloid K-120N, available from Rohm & Haas, Philadelphia, Pa.; urethane acrylates, such as those described in U.S. Pat. No. 4,249,011 and those available from Sartomer Corp., Westchester, Pa; and urethane hardcoats obtained from the reaction of an aliphatic polyisocyanate (e.g., Desmodur N-3300, available from Miles, Inc., Pittsburgh, Pa.) with a polyester (e.g., Tone Polyol 0305, available from Union Carbide, Houston, Tex.).

The multilayer optical films can be laminated to rigid or semi-rigid substrates, such as, for example, glass, metal, acrylic, polyester, and other polymer backings, to provide structural rigidity, weatherability, or easier handling. For example, the multilayer optical films can be laminated to a thin acrylic or metal backing so that it can be stamped or otherwise formed and maintained in a desired shape. For some applications, such as when the film is applied to other breakable backings, an additional layer including, for example, PET film or puncture-tear resistant film may be used.

The multilayer optical films can be provided with shatter resistant films and coatings. Films and coatings suitable for this purpose are described, for example, in publications EP 592284 and EP 591055, incorporated herein by reference, and are available commercially from 3M, St. Paul, Minn.

Various optical layers, materials, and devices can also be applied to, or used in conjunction with, the films and devices of the present invention for specific applications. These include, but are not limited to, magnetic or magneto-optic coatings or films; liquid crystal panels, such as those used in display panels and privacy windows; photographic emulsions; fabrics; prismatic films, such as linear Fresnel lenses; brightness enhancement films; holographic films or images; embossable films; anti-tamper films or coatings; IR transparent films for low emissivity applications; release films or release coated paper; and polarizers or mirrors.

Multiple additional layers on one or both major surfaces of the multilayer optical film are contemplated, and can be any combination of the aforementioned coatings or films. For example, when an adhesive is applied to the multilayer optical film, the adhesive can contain a white pigment such as titanium dioxide to increase the overall reflectivity, or it can be optically transparent to allow the reflectivity of the substrate to add to the reflectivity of the multilayer optical film.

The multilayer optical films can also include one or more anti-reflective layers or coatings, such as, for example, conventional vacuum coated dielectric metal oxide or metal/metal oxide optical films, silica sol gel coatings, and coated or coextruded anti-reflective layers such as those derived from low index fluoropolymers such as Dyneon THV, an extrudable fluoropolymer available from Dyneon LLC (Oakdale, Minn.). Such layers or coatings, which may or may not be polarization sensitive, serve to increase transmission and to reduce reflective glare, and can be imparted to the multilayer optical films through appropriate surface treatment, such as coating or sputter etching.

The multilayer optical films can be provided with a film or coating which imparts anti-fogging properties. In some cases, an anti-reflection layer as described above will serve the dual purpose of imparting both anti-reflection and anti-fogging properties to the film or device. Various anti-fogging agents are known to the art. Typically, however, these materials include substances, such as fatty acid esters, which impart hydrophobic properties to the film surface and which promote the formation of a continuous, less opaque film of water.

Coatings which reduce the tendency for surfaces to "fog" have been reported by several inventors. For example, U.S. Pat. No. 3,212,909 to Leigh discloses the use of ammonium soap, such as alkyl ammonium carboxylates in admixture with a surface active agent which is a sulfated or sulfonated fatty material, to produce a anti-fogging composition. U.S. Pat. No. 3,075,228 to Elias discloses the use of salts of sulfated alkyl aryloxypolyalkoxy alcohol, as well as alkyl-benzene sulfonates, to produce an anti-fogging article useful in cleaning and imparting anti-fogging properties to various surfaces. U.S. Pat. No. 3,819,522 to Zmoda discloses the use of surfactant combinations including derivatives of decyne diol as well as surfactant mixtures which include ethoxylated alkyl sulfates in an anti-fogging window cleaner surfactant mixture. Japanese Patent Kokai No. Hei 6[1994]41, 335 discloses a clouding and drip preventive composition including colloidal alumina, colloidal silica and an anionic surfactant. U.S. Pat. No. 4,478,909 (Taniguchi et al) discloses a cured anti-fogging coating film which includes polyvinyl alcohol, a finely divided silica, and an organic silicon compound, the carbon/silicon weight ratio apparently being important to the film's reported anti-fogging properties. Various surfactants, include fluorine-containing surfactants, may be used to improve the surface smoothness of the coating. Other anti-fog coatings incorporating surfactants are described in U.S. Pat. Nos. 2,803,552; 3,022,178; and 3,897,356. Published PCT Application No. WO96/18, 691 (Scholtz et al) discloses a method by which coatings can impart both anti-fog and anti-reflective properties.

The multilayer optical films can be protected from UV radiation through the use of UV stabilized films or coatings. Suitable UV stabilized films and coatings include those which incorporate benzotriazoles or hindered amine light stabilizers (HALS) such as Tinuvin™ 292, 326, and 327, all of which are available commercially from Ciba Geigy Corp., Hawthorne, N.Y. Other suitable UV stabilized films and coatings include those which contain benzophenones or diphenyl acrylates, available commercially from BASF Corp., Parsippany, N.J. Such films or coatings can be particularly desirable when the multilayer optical films are used in outdoor applications or in luminaires where the source emits significant amount of light in the UV region of the spectrum.

The multilayer optical films can be treated with, for example, inks, dyes, or pigments to alter their appearance or to customize them for specific applications. Thus, for example, the films can be treated with inks or other printed indicia such as those used to display product identification, advertisements, warnings, decoration, or other information. Various techniques can be used to print on the film, such as, for example, screen printing, letterpress printing, offset printing, flexographic printing, stipple printing, laser printing, and so forth, and various types of ink can be used, including one and two component inks, oxidatively drying and UV-drying inks, dissolved inks, dispersed inks, and 100% ink systems. Dyes or pigments can be blended into a polymer either before or after formation of layers using the polymer.

The appearance of the multilayer optical film 10 can also be altered by coloring the film, such as by laminating a dyed film to the multilayer optical film, applying a pigmented coating to the surface of the film, or including a pigment in one or more of the materials used to make the film. Both visible and near IR dyes and pigments can be used and include, for example, optical brighteners and dyes that absorb in the UV and fluoresce in the visible region of the color spectrum.

Other layers that can be added to alter the appearance of the multilayer optical film include, for example, opacifying (black) layers, diffusing layers, holographic images or holographic diffusers, and metal layers. Each of these can be applied directly to one or both surfaces of the film, or may be a component of a second film or foil construction that is laminated to the film. Alternately, some components such as opacifying or diffusing agents, or colored pigments, can be included in an adhesive layer which is used to laminate the film to another surface.

The multilayer optical film can also be provided with a metal coating. For example, a metallic layer may be applied directly to the optical film by, for example, pyrolysis, powder coating, vapor deposition, cathode sputtering, ion plating, and the like. Metal foils or rigid metal plates can also be laminated to the optical film. Separate polymeric films or glass or plastic sheets can be first metallized and then laminated to the multilayer optical film.

Manufacturing

A brief description of one method for forming multilayer optical films is provided. A fuller description of the process conditions and considerations is found in PCT Publications Nos. WO 99/36248, WO 99/06203, and WO 99/36812, all of which are incorporated herein by reference.

An initial step in the manufacture of the multilayer optical films is the generation of the polymers to be used in formation of the first and second optical layers, as well as the non-optical layers (unless the polymers are available commercially). Typically, these polymers are formed by extrusion, although other methods of polymer formation can may be used. Extrusion conditions are chosen to adequately feed, melt, mix and pump the polymer resin feed streams in a continuous and stable manner. Final melt stream temperatures are chosen to be within a range that reduces freezing, crystallization, or unduly high pressure drops at the low end of the range and that reduces degradation at the high end of the range. The entire melt stream processing of more than one polymer, up to and including film casting on a chill roll, is often referred to as co-extrusion.

Preferably, the polymers of the first optical layers, the second optical layers, and the non-optical layers are chosen to have similar rheological properties (e.g., melt viscosities) so that they can be co-extruded. Typically, the second optical layers and the non-optical layers have a glass transition temperature, $T_g$, that is either below or no greater than about 40° C. above the glass transition temperature of the first optical layers. Preferably, the glass transition temperature of the second optical layers and the non-optical layers is below the glass transition temperature of the first optical layers.

Following extrusion, each melt stream is conveyed to a gear pump used to regulate the continuous and uniform rate of polymer flow. A static mixing unit can be used to carry the polymer melt stream from the gear pump into a multilayer feedblock with uniform melt stream temperature. The entire melt stream is typically heated as uniformly as possible to enhance both uniform flow of the melt stream and reduce degradation during melt processing.

Multilayer feedblocks divide each of the two or more polymer melt streams into many layers, interleave these layers, and combine the many layers into a single multilayer stream. The layers from any given melt stream are created by sequentially bleeding off part of the stream from a main flow channel into side channel tubes which lead to layer slots in the feed block manifold. The layer flow can be controlled by choices made in machinery, as well as the shape and physical dimensions of the individual side channel tubes and layer slots.

The side channel tubes and layer slots of the two or more melt streams are often interleaved to form alternating layers. The feedblock's downstream-side manifold is typically shaped to compress and uniformly spread the layers of the combined multilayer stack transversely. Thick, non-optical layers, known as protective boundary layers (PBLs), can be fed near the manifold walls using the melt streams of the optical multilayer stack, or by a separate melt stream. As described above, these non-optical layers can be used to protect the thinner optical layers from the effects of wall stress and possible resulting flow instabilities.

The multilayer stack exiting the feedblock manifold enters a final shaping unit such as a die. Alternatively, the stream can be split, preferably normal to the layers in the stack, to form two or more multilayer streams that can be recombined by stacking. The stream can also be split at an angle other than normal to the layers. A flow channeling system that splits and stacks the streams is called a multiplier. The width of the split streams (i.e., the sum of the thicknesses of the individual layers) can be equal or unequal. The multiplier ratio is defined as the ratio of the wider to narrower stream widths. Unequal streams widths (i.e., multiplier ratios greater than unity) can be useful in creating layer thickness gradients. In the case of unequal stream widths, the multiplier may spread the narrower stream and/or compress the wider stream transversely to the thickness and flow directions to ensure matching layer widths upon stacking.

Prior to multiplication, additional non-optical layers can be added to the multilayer stack. These non-optical layers may perform as PBLs within the multiplier. After multiplication and stacking, some of these layers can form internal boundary layers between optical layers, while others form skin layers.

After multiplication, the web is directed to a final shaping unit. The web is then cast onto a chill roll, sometimes also referred to as a casting wheel or casting drum. This casting is often assisted by electrostatic pinning, the details of which are well-known in the art of polymer film manufacture. The web can be cast to a uniform thickness across the web or a deliberate profiling of the web thickness can be induced using die lip controls.

The multilayer web is then drawn to produce the final multilayer optical film. In one exemplary method for making a multilayer optical polarizer, a single drawing step is used. This process may be performed in a tenter or a length orienter. Typical tenters draw in a transverse direction (TD) to the web path, although certain tenters are equipped with mechanisms to draw or relax (shrink) the film dimensionally in the web path or machine direction (MD). Thus, in this exemplary method, a film is drawn in one in-plane direction. The second in-plane dimension is either held constant as in a conventional tenter, or is allowed to neck in to a smaller width as in a length orienter. Such necking in can be substantial and may increase with draw ratio.

In one exemplary method for making a multilayer mirror, a two step drawing process is used to orient the birefringent material in both in-plane directions. The draw processes can be any combination of the single step processes described that allow drawing in two in-plane directions. In addition, a tenter that allows drawing along the machine direction, e.g. a biaxial tenter which can draw in two directions sequentially or simultaneously, can be used. In this latter case, a single biaxial draw process can be used.

In still another method for making a multilayer polarizer, a multiple drawing process is used that exploits the different behavior of the various materials to the individual drawing steps to make the different layers of different materials within a single coextruded multilayer film possess different degrees and types of orientation relative to each other. Mirrors can also be formed in this manner.

The intrinsic viscosity of the polyesters used in these layers and films is related to the molecular weight (in the absence of branching monomers) of the polymer. Typically, the polyesters have an intrinsic viscosity about 0.4 dL/g or greater. Preferably, the intrinsic viscosity is between about 0.4 to 0.7 dL/g. Intrinsic viscosity, for purposes of this disclosure, is measured in a 60/40 wt. % phenol/o-dichlorobenzene solvent at 30° C. unless otherwise indicated.

The following examples demonstrate the manufacture and uses of multilayer optical films of the invention. It is to be understood that these examples are merely illustrative and are in no way to be interpreted as limiting the scope of the invention.

EXAMPLES

Monomers, catalysts, and stabilizers utilized in creating polymers for these examples are commercially available from the following suppliers: dimethyl naphthalene dicarboxylate from Amoco (Decatur, Ala.), dimethyl terephthalate from Hoechst Celanese (Dallas, Tex.), ethylene glycol from Union Carbide (Charleston, W. Va.), 1,6-hexanediol from BASF (Charlotte, N.C.), antimony triacetate from Elf Atochem (Philadelphia, Pa.), cobalt acetate from Hall Chemical (Wickliffe, Ohio), zinc acetate from G. T. Baker (Phillipsberg, N.J.), trimethylol propane from Hoechst-Celanese (Bishop, Tex.), trans-dimethyl cyclohexane dicarboxylate from Eastman Chemical (Kingsport, Tenn.), and triethyl phosphonoacetate from Albright & Wilson (Glen Allen, Va.).

In each of the examples described below, an 836 layer film is formed. The 836 optical layer construction includes four multilayer optical stacks of graded layer thicknesses as obtained by the double multiplication of a 209 layer construction from a multilayer feed block. The optical layers account for approximately 50 percent of the thickness of the construction. Each of the stacks is separated by one of three non-optical internal protective boundary layers, each accounting for about 2% of the total thickness. Finally, each side of the film possesses an outer non-optical skin layer, each accounting for approximately 11% of the thickness.

A "gain tester" was used to test several of the films in the Examples. The "gain tester" can be fabricated using a spot photometer and a suitable backlight with a polarizer placed between the two so that only one polarization of light from the backlight is measured by the photometer. Suitable spot photometers include the Minolta LS-100 and LS-110 (Minolta Co., Ltd., Ramsey, N.J.). The absolute value of a measured gain depends, at least in part, on the backlight used and on the orientation of the sample on the backlight, as well as the size of the sample. The backlight used in the Examples was obtained from Landmark and the polarizer was a high contrast display polarizer which was oriented so that the pass axis of the polarizer was aligned with the long axis of the backlight. The sample was inserted into the tester so that the pass axis of the sample was aligned with the pass axis of the high contrast polarizer. The sample was made large enough to cover the entire backlight.

Transmission measurements were made using a spectrometer including an Oriel 127i spectrograph and Oriel Instaspec II PhotoDiode Array (Oriel Instruments, Stratford, Conn.) and a sphere illuminator and tungsten halogen light source. Transmission measurements were made according to a method that produces results substantially similar to ASTM E275-93.

Example 1
Polarizing Film with coPEN (40/60)/coPET Layers

A multilayer reflective polarizer film was constructed with first optical layers created from a co-polyethylene naphthalate with carboxylate subunits derived from 40 mol % dimethyl naphthalene dicarboxylate and 60 mol % dimethyl terephthalate, and glycol subunits derived from 100 mol % ethylene glycol subunits, and second optical layers created from a co-polyethylene terephthalate with carboxylate subunits derived from 70 mol % terephthalate dicarboxylate and 30 mol % trans-dimethyl cyclohexane dicarboxylate, and glycol subunits derived from 99.5 mol % ethylene glycol and 0.5 mol % trimethylol propane.

The co-polyethylene naphthalate used to form the first optical layers was synthesized in a batch reactor with the following raw material charge: 67.7 pbw (parts by weight) dimethyl naphthalene dicarboxylate, 80.5 pbw dimethyl terephthalate, 75 pbw ethylene glycol, 0.027 pbw zinc acetate, 0.027 pbw cobalt acetate, and 0.048 pbw antimony triacetate. Under pressure of 2 atm, this mixture was heated to 254° C. while removing methanol. After 36 pbw of methanol was removed, 51 pbw of triethyl phosphonoacetate was charged to the reactor and then the pressure was gradually reduced to 1 torr while heating to 290° C. The condensation reaction by-product, ethylene glycol, was continuously removed until a polymer with an intrinsic viscosity of 0.55 dug, as measured in 60/40 wt. % phenol/o-dichlorobenzene, was produced.

The co-polyethylene terephthalate used to form the second optical layers was synthesized in a batch reactor with the following raw material charge: 102 pbw dimethyl terephthalate, 44 pbw trans-dimethyl cyclohexane dicarboxylate, 99 pbw ethylene glycol, 0.363 pbw trimethylol propane, 0.036 pbw zinc acetate, 0.036 pbw cobalt acetate, and 0.065 pbw antimony triacetate. Under pressure of 2 atm, this mixture was heated to 254° C. while removing methanol. After 48 pbw of methanol was removed, 0.070 pbw of triethyl phosphonoacetate was charged to the reactor and then the pressure was gradually reduced to 1 torr while heating to 290° C. The condensation reaction by-product, ethylene glycol, was continuously removed until a polymer with an intrinsic viscosity of 0.70 dL/g, as measured in 60/40 wt. % phenol/o-dichlorobenzene, was produced.

The above described copolymers were then coextruded through a multilayer melt manifold to create a multilayer film with 836 alternating first and second optical layers. This particular multilayer reflective film also contained internal and external protective layers made of the same co(polyethylene terephthalate) as the second optical layers. The cast film was heated in an oven charged with hot air set at 93° C. and then uniaxially oriented at a 6:1 draw to produce a reflective polarizer of approximately 125 μm thickness. The glass transition temperature of the coPEN of the first optical layers is about 95° C.

The multilayer reflective polarizer film was placed within a liquid crystal computer display. The display brightness increased by 55%, corresponding to a luminance gain of 1.55. The multilayer reflective polarizer film transmitted, for normally incident light, 81% of the light have the pass polarization and 3.9% of the light having the other (non-pass) polarization. For off-angle light (60 degrees from normal), the multilayer reflective polarizer film transmitted 81% of the pass polarization.

Example 2
Polarizing Film with coPEN (40/60)/coPET Layers

A multilayer reflective polarizer film was constructed as in Example 1, except that the multilayer reflective polarizer was uniaxially oriented at a temperature of 88° C. The glass transition temperature of the coPEN of the first optical layers is about 95° C.

The multilayer reflective polarizer film was placed within a liquid crystal computer display. The display brightness increased by 54%, corresponding to a luminance gain of 1.54. The multilayer reflective polarizer film transmitted, for normally incident light, 88% of the light have the pass polarization and 1.9% of the light having the other (non-pass) polarization. For off-angle light (60 degrees from normal), the multilayer reflective polarizer film transmitted 85% of the pass polarization.

Example 3
Polarizing Film with coPEN (40/60)/coPET Layers

A multilayer reflective polarizer film was constructed as in Example 1, except that the multilayer reflective polarizer was uniaxially oriented at a temperature of 82° C. The glass transition temperature of the coPEN of the first optical layers is about 95° C.

The multilayer reflective polarizer film was placed within a liquid crystal computer display. The display brightness increased by 54%, corresponding to a luminance gain of 1.54. The multilayer reflective polarizer film transmitted, for normally incident light, 87% of the light have the pass polarization and 2.5% of the light having the other (non-pass) polarization. For off-angle light (60 degrees from normal), the multilayer reflective polarizer film transmitted 87% of the pass polarization.

Example 4
Polarizing Film with Block coPEN (40/60)/coPET Layers

A multilayer reflective polarizer film was constructed with first optical layers created from a co-polyethylene naphthalate with carboxylate subunits derived from 40 mol % dimethyl naphthalene dicarboxylate and 60 mol % dimethyl terephthalate, and glycol subunits derived from 100 mol % ethylene glycol subunits, and second optical layers created from a co-polyethylene terephthalate with carboxylate subunits derived from 85 mol % terephthalate dicarboxylate and 15 mol % trans-dimethyl cyclohexane dicarboxylate, and glycol subunits derived from 99.5 mol % ethylene glycol and 0.5 mol % trimethylol propane.

The co-polyethylene naphthalate used to form the first optical layers was created from a blend of 55 wt. % polyethylene naphthalate (PET) and 45 wt. % coPEN with carboxylate subunits derived from 92 mol % dimethyl naphthalene dicarboxylate and 8 mol % dimethyl terephthalate, and glycol subunits derived from 100 mol % ethylene glycol subunits.

The PET used in the blend to form the first optical layers was synthesized in a batch reactor with the following raw material charge: 138 pbw dimethyl terephthalate, 93 pbw ethylene glycol, 0.027 pbw zinc acetate, 0.027 pbw cobalt acetate, and 0.048 pbw antimony triacetate. Under pressure of 2 atm, this mixture was heated to 254° C. while removing methanol. After 45 pbw of methanol was removed, 0.052 pbw of triethyl phosphonoacetate was charged to the reactor and then the pressure was gradually reduced to 1 torr while heating to 290° C. The condensation reaction by-product, ethylene glycol, was continuously removed until a polymer with an intrinsic viscosity of 0.60 dL/g, as measured in 60/40 wt. % phenol/o-dichlorobenzene, was produced.

The coPEN used in the blend to form the first optical layers was synthesized in a batch reactor with the following raw material charge: 126 pbw dimethyl naphthalene dicarboxylate, 11 pbw dimethyl terephthalate, 75 pbw ethylene glycol, 0.027 pbw zinc acetate, 0.027 pbw cobalt acetate, and 0.048 pbw antimony triacetate. Under pressure of 2 atm, this mixture was heated to 254° C. while removing methanol. After 36 pbw of methanol was removed, 0.049 pbw of triethyl phosphonoacetate was charged to the reactor and then the pressure was gradually reduced to 1 torr while heating to 290° C. The condensation reaction by-product, ethylene glycol, was continuously removed until a polymer with an intrinsic viscosity of 0.50 dL/g, as measured in 60/40 wt. % phenol/o-dichlorobenzene, was produced.

The co-polyethylene terephthalate used to form the second optical layers was synthesized in a batch reactor with the following raw material charge: 125 pbw dimethyl terephthalate, 22 pbw trans-dimethyl cyclohexane dicarboxylate, 94 pbw ethylene glycol, 0.363 pbw trimethylol propane, 0.036 pbw zinc acetate, 0.036 pbw cobalt acetate, and 0.065 pbw antimony triacetate. Under pressure of 2 atm, this mixture was heated to 254° C. while removing methanol. After 48 pbw of methanol was removed, 0.070 pbw of triethyl phosphonoacetate was charged to the reactor and then the pressure was gradually reduced to 1 torr while heating to 290° C. The condensation reaction by-product, ethylene glycol, was continuously removed until a polymer with an intrinsic viscosity of 0.70 dUg, as measured in 60/40 wt. % phenol/o-dichlorobenzene, was produced.

The above described copolymers were then coextruded through a multilayer melt manifold to create a multilayer film with 836 alternating first and second optical layers. This particular multilayer reflective film also contained internal and external protective layers made of the same co(polyethylene terephthalate) as the second optical layers. The cast film was heated in an oven charged with hot air set at 99° C. and then uniaxially oriented at a 6:1 draw to produce a reflective polarizer of approximately 125 μm thickness. The glass transition temperature of the coPEN of the first optical layers is about 95° C.

The multilayer reflective polarizer film was placed within a liquid crystal computer display. The display brightness increased by 51%, corresponding to a luminance gain of 1.51. The multilayer reflective polarizer film transmitted, for normally incident light, 89% of the light have the pass polarization and 8.5% of the light having the other (non-pass) polarization. For off-angle light (60 degrees from normal), the multilayer reflective polarizer film transmitted 86% of the pass polarization.

Example 5
Polarizing Film with Block coPEN (40/60)/coPET Layers

A multilayer reflective polarizer film was constructed as in Example 4, except that the multilayer reflective polarizer was uniaxially oriented at a temperature of 93° C. The glass transition temperature of the coPEN of the first optical layers is about 95° C.

The multilayer reflective polarizer film was placed within a liquid crystal computer display. The display brightness increased by 55%, corresponding to a luminance gain of 1.55. The multilayer reflective polarizer film transmitted, for normally incident light, 89% of the light have the pass polarization and 4.8% of the light having the other (non-pass) polarization. For off-angle light (60 degrees from normal), the multilayer reflective polarizer film transmitted 87% of the pass polarization.

Example 6
Polarizing Film with coPEN (50/50)/PETG Layers

A multilayer reflective polarizer film can be constructed with first optical layers created from a co-polyethylene naphthalate with carboxylate subunits derived from 50 mol % dimethyl naphthalene dicarboxylate and 50 mol % dimethyl terephthalate, and glycol subunits derived from 100 mol % ethylene glycol subunits, and second optical layers created from a co-polyethylene terephthalate (coPET) with carboxylate subunits derived from 100 mol % terephthalate dicarboxylate, and glycol subunits derived from ethylene glycol and cyclohexane dimethanol. This coPET is available as PETG from Eastman Chemical Co., Kingsport, Tenn.

The co-polyethylene naphthalate used to form the first optical layers can be synthesized in a batch reactor with the following raw material charge: 83 pbw dimethyl naphthalene dicarboxylate, 66 pbw dimethyl terephthalate, 87 pbw ethylene glycol, 0.027 pbw zinc acetate, 0.027 pbw cobalt acetate, and 0.048 pbw antimony triacetate. Under pressure of 2 atm, this mixture is heated to 254° C. while removing methanol. After 43 pbw of methanol is removed, 0.051 pbw of triethyl phosphonoacetate is charged to the reactor and then the pressure is gradually reduced to 1 torr while heating to 290° C. The condensation reaction by-product, ethylene glycol, is continuously removed until a polymer with an intrinsic viscosity of 0.55 dL/g, as measured in 60/40 wt. % phenol/o-dichlorobenzene, is produced.

The above described copolymers are then coextruded through a multilayer melt manifold to create a multilayer film with 836 alternating first and second optical layers. This multilayer reflective film can also contain internal and external protective layers made of the same co(polyethylene terephthalate) as the second optical layers. The cast film is heated in an oven charged with hot air set at about 110° C. and then uniaxially oriented at a 6:1 draw to produce a reflective polarizer of approximately 125 μm thickness.

Example 7
Polarizing Film with coPEN (60/40)/PETG Layers

A multilayer reflective polarizer film can be constructed with first optical layers created from a co-polyethylene naphthalate with carboxylate subunits derived from 60 mol % dimethyl naphthalene dicarboxylate and 40 mol % dimethyl terephthalate, and glycol subunits derived from 100 mol % ethylene glycol subunits, and second optical layers created from a co-polyethylene terephthalate (coPET) with carboxylate subunits derived from 100 mol % terephthalate dicarboxylate, and glycol subunits derived from ethylene glycol and cyclohexane dimethanol. This coPET is available as PETG from Eastman Chemical Co., Kingsport, Tenn.

The co-polyethylene naphthalate used to form the first optical layers can be synthesized in a batch reactor with the following raw material charge: 98 pbw dimethyl naphthalene dicarboxylate, 52 pbw dimethyl terephthalate, 87 pbw ethylene glycol, 0.027 pbw zinc acetate, 0.027 pbw cobalt acetate, and 0.048 pb.w antimony triacetate. Under pressure of 2 atm, this mixture is heated to 254° C. while removing methanol. After 41 pbw of methanol is removed, 0.051 pbw of triethyl phosphonoacetate is charged to the reactor and then the pressure is gradually reduced to 1 torr while heating to 290° C. The condensation reaction by-product, ethylene glycol, is continuously removed until a polymer with an intrinsic viscosity of 0.53 dL/g, as measured in 60/40 wt. % phenol/o-dichlorobenzene, is produced.

The above described copolymers are then coextruded through a multilayer melt manifold to create a multilayer film with 836 alternating first and second optical layers. This multilayer reflective film can also contain internal and external protective layers made of the same co(polyethylene terephthalate) as the second optical layers. The cast film is heated in an oven charged with hot air set at about 115° C. and then uniaxially oriented at a 6:1 draw to produce a reflective polarizer of approximately 125 μm thickness.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A multilayer optical body, comprising:
    a plurality of birefringent first optical layers, each first optical layer comprising a copolymer of polyethylene naphthalate with less than 70 mol % of the carboxylate subunits of the copolymer being naphthalate subunits; and
    a plurality of second optical layers interleaved with the first optical layers, the second optical layers having a lower in-plane birefringence than the first optical layers for 632.8 nm light.

2. The multilayer optical body of claim 1, wherein each first optical layer has an in plane birefringence of at least 0.19 for 632.8 nm light.

3. The multilayer optical body of claim 1, wherein the copolymer of polyethylene naphthalate is a random copolymer.

4. The multilayer optical body of claim 1, wherein the copolymer of polyethylene naphthalate is a block copolymer.

5. The multilayer optical body of claim 1, wherein each of the first optical layers comprises a copolymer of polyethylene naphthalate with about 25 to 65 mol % of the carboxylate subunits of the copolymer being naphthalate subunits.

6. The multilayer optical body of claim 1, wherein the second optical layers have an in-plane birefringence of no more than about 0.04 for 632.8 nm light.

7. The multilayer optical body of claim 1, wherein each of the second optical layers comprises a copolymer of polyethylene terephthalate.

8. The multilayer optical body of claim 7, wherein the copolymer of polyethylene terephthalate contains terephthalate subunits, ethylene glycol subunits, and comonomer subunits derived from at least one compound selected from the group consisting of aliphatic diacids and aliphatic diols.

9. The multilayer optical body of claim 1, wherein the copolymer of polyethylene naphthalate transmits substantially more light in the range of 380 to 400 nm than polyethylene naphthalate.

10. The multilayer optical body of claim 1, wherein the copolymer of polyethylene naphthalate is orientable at a temperature that is no greater than a glass transition temperature of the copolymer to produce an in-plane birefringence of at least 0.19 for 632.8 nm light.

11. A multilayer optical body, comprising:
    a plurality of birefringent first optical layers, each first optical layer comprising a polymer configured so as to yield an in-plane birefringence of at least about 0.16 at 632.8 nm after orientation at a temperature that is about the glass transition temperature of the polymer or lower; and
    a plurality of second optical layers interleaved with the first optical layers, wherein the second optical layers have a lower in-plane birefringence than the first optical layers for 632.8 nm light.

12. The multilayer optical body of claim 11, wherein the polymer of the first optical layers is a copolymer of polyethylene naphthalate.

13. The multilayer optical body of claim 11, wherein the copolymer of polyethylene naphthalate is a random copolymer.

14. The multilayer optical body of claim 11, wherein the polymer of each first optical layer has an in-plane birefringence of at least about 0.16 for 632.8 nm light.

15. The multilayer optical body of claim 11, wherein the polymer capable of yielding an in-plane birefringence of at least 0.19 at 632.8 nm after orientation at a temperature that is about the glass transition temperature of the copolymer or lower.

16. A multilayer optical body, comprising:

a plurality of birefringent first optical layers, each first optical layer comprising a copolymer of polyethylene naphthalate having. no more than about 20% crystallinity as determined using differential scanning calorimetry; and a plurality of second optical layers interleaved with the first optical layers, the second optical layers having a lower in-plane birefringence than the first optical layers for 632.8 nm light.

17. The multilayer optical body of claim 16, wherein each first optical layer has an in-plane birefringence of at least 0.19 for 632.8 nm light.

18. The multilayer optical body of claim 16, wherein the copolymer of polyethylene naphthalate is capable of orientation to give an in-plane birefringence of at least 0.19 for 632.8 nm light.

19. A multilayer optical body, comprising:

a plurality of polymeric first optical layer, each first optical layer having an optical efficacy of no more than about 0.10, and wherein each of the first optical layers comprises a copolymer of polyethylene naphthalate; and a plurality of polymeric second optical layers interleaved with the first optical layer, the second optical layers having a lower in-plane birefringence than the first optical layers for 632.8 nm light.

* * * * *

UNITED STATES PATENT AND TRADEMARK OFFICE
CERTIFICATE OF CORRECTION

PATENT NO. : 6,449,093 B2
DATED : September 10, 2002
INVENTOR(S) : Hebrink, Timothy J.

It is certified that error appears in the above-identified patent and that said Letters Patent is hereby corrected as shown below:

Column 3,
Lines 3-4, delete "orientation 135° C." and insert in place thereof -- orientation at 135° C. --.

Column 4,
Line 16, delete "Although," and insert in place thereof -- Although --.

Column 4,
Line 51, delete "e.g." and insert in place thereof -- e.g., --.

Column 8,
Table 1, row 1, column 3, delete "19" and insert in place thereof -- 119 --.

Column 12,
Line 42, delete "or." and insert in place thereof -- or --.

Column 17,
Lines 17-18, delete "can may" and insert in place thereof -- can --.

Column 18,
Line 9, delete "streams" and insert in place thereof -- stream --.

Column 19,
Line 18, delete "Phillipsberg" and insert in place thereof -- Phillipsburg --.

Column 19,
Line 53, delete "Stratfort" and insert in place thereof -- Stratford --.

Column 20,
Line 18, delete "dug" and insert in place thereof -- dL/g --.

Column 22,
Line 14, delete "dUg" and insert in place thereof -- dL/g --.

UNITED STATES PATENT AND TRADEMARK OFFICE
CERTIFICATE OF CORRECTION

PATENT NO.    : 6,449,093 B2
DATED         : September 10, 2002
INVENTOR(S)   : Hebrink, Timothy J.

It is certified that error appears in the above-identified patent and that said Letters Patent is hereby corrected as shown below:

<u>Column 23,</u>
Line 42, delete "pb.w" and insert in place thereof -- pbw --.

<u>Column 24,</u>
Line 13, delete "in plane" and insert in place thereof -- in-plane --.

<u>Column 25,</u>
Line 4, delete "having." and insert in place thereof -- having --.

Signed and Sealed this

Twenty-sixth Day of August, 2003

JAMES E. ROGAN
*Director of the United States Patent and Trademark Office*